US012571561B1

(12) United States Patent
Chen

(10) Patent No.: US 12,571,561 B1
(45) Date of Patent: Mar. 10, 2026

(54) WINDPROOF STRUCTURE FOR FLUE OUTLET AND GAS WATER HEATER

(71) Applicant: Xiong Chen, Zhongshan (CN)

(72) Inventor: Xiong Chen, Zhongshan (CN)

( * ) Notice: Subject to any disclaimer, the term of this patent is extended or adjusted under 35 U.S.C. 154(b) by 0 days.

(21) Appl. No.: 19/305,687

(22) Filed: Aug. 20, 2025

(30) Foreign Application Priority Data

Jul. 30, 2025 (CN) .......................... 202521611683.4

(51) Int. Cl.
*F24H 9/00* (2022.01)
*B60P 3/36* (2006.01)
*F23M 9/00* (2006.01)

(52) U.S. Cl.
CPC .............. *F24H 9/0026* (2013.01); *B60P 3/36* (2013.01); *F23M 9/006* (2013.01)

(58) Field of Classification Search
CPC ........ F24H 9/0026; F24H 9/0031; F22B 9/12; F22B 13/04; B60P 3/36; F23M 9/006; F23M 9/003
See application file for complete search history.

(56) References Cited

U.S. PATENT DOCUMENTS

| | | | | | |
|---|---|---|---|---|---|
| 3,327,609 | A | * | 6/1967 | Sage | ..................... F24C 15/002 |
| | | | | | 126/85 B |
| 3,994,280 | A | * | 11/1976 | Winters | ................... F23L 17/04 |
| | | | | | 126/307 A |
| 4,286,569 | A | * | 9/1981 | Bergman | ................ F23L 17/04 |
| | | | | | 62/239 |
| 7,111,590 | B1 | | 9/2006 | Huang et al. | |
| 10,480,819 | B2 | * | 11/2019 | Ragg | ....................... F24H 1/207 |
| 12,123,625 | B2 | | 10/2024 | Kakizaki | |
| 2008/0066694 | A1 | | 3/2008 | Smith et al. | |
| 2010/0031900 | A1 | | 2/2010 | Consadori et al. | |

FOREIGN PATENT DOCUMENTS

| | | | | | |
|---|---|---|---|---|---|
| CN | 101799167 | B | * | 6/2012 | |
| CN | 204942677 | U | * | 1/2016 | |
| CN | 105416003 | B | * | 8/2017 | ......... B60H 1/00471 |
| CN | 108006987 | A | * | 5/2018 | .......... F24H 9/2035 |
| CN | 108357329 | A | * | 8/2018 | ......... B60H 1/00364 |
| CN | 208154798 | U | * | 11/2018 | |
| CN | 209326081 | U | * | 8/2019 | |
| CN | 212691815 | U | * | 3/2021 | |
| CN | 213509398 | U | * | 6/2021 | |
| CN | 218210081 | U | * | 1/2023 | |
| CN | 219199490 | U | * | 6/2023 | |

* cited by examiner

*Primary Examiner* — Gregory A Wilson

(57) ABSTRACT

A windproof structure for the flue outlet includes a flue passage and an air deflector. The flue passage extends in a preset direction and has, in an extension direction, a first port and a second port that are in communication. The first port is configured to be in communication with the outside, and the second port is configured to be in communication with a flue pipe of the gas water heater. The air deflector is disposed outside the flue passage and located on one side of the first port facing away from the second port. The air deflector is spaced apart from the first port by a preset distance, and an orthogonal projection of the air deflector onto the first port covers the first port.

11 Claims, 6 Drawing Sheets

1

102

101

102h

1

WINDPROOF STRUCTURE FOR FLUE OUTLET AND GAS WATER HEATER

RELATED APPLICATIONS

The present patent document claims the benefit of priority to Chinese Patent Application No. 202521611683.4, filed on Jul. 30, 2025, and entitled "WINDPROOF STRUCTURE FOR FLUE OUTLET AND GAS WATER HEATER," the entire contents of each of which are incorporated herein by reference.

BACKGROUND

1. Technical Field

The present disclosure relates to the technical field of recreational vehicle accessories, and in particular, to a windproof structure for a flue outlet and a gas water heater.

2. Background Information

A gas water heater is an important living appliance in recreational vehicles, and the exhaust efficiency of the gas water heater significantly affects the use experience of the recreational vehicles.

An existing housing door panel of the gas water heater for the recreational vehicle is of a flat structure, which results in a flue outlet of the gas water heater being directly exposed to the exterior of the recreational vehicle. A movable flap is disposed in the flue outlet for wind protection, and the flue outlet directly faces a windward side. When there is wind outside, the movable flap inside the flue outlet may have difficulty in opening due to high wind resistance, severely affecting the exhaust effect of the gas water heater and easily causing it to fail to operate normally. When the external wind force is greater than the exhaust airflow of the gas water heater, the movable flap inside the flue outlet may fail to open, resulting in the gas water heater being unable to operate.

BRIEF SUMMARY

The present disclosure provides a windproof structure for a flue outlet and a gas water heater, achieving an objective of assisting the gas water heater in a recreational vehicle in more efficient exhaust.

In order to achieve the above objective, the present disclosure provides following technical solutions.

A first aspect of the present disclosure provides a windproof structure for a flue outlet. The windproof structure for the flue outlet includes a flue passage and an air deflector. The flue passage extends in a preset direction and has, in an extension direction, a first port and a second port that are in communication. The first port is configured to be in communication with the outside, and the second port is configured to be in communication with a flue pipe of the gas water heater. The air deflector is disposed outside the flue passage and located on one side of the first port facing away from the second port. The air deflector is spaced apart from the first port by a preset distance, and an orthogonal projection of the air deflector onto the first port covers the first port.

In one embodiment of the windproof structure for the flue outlet provided in the first aspect of the present disclosure, a cross section of the flue passage is circular, and an inner diameter of the passage decreases from the first port to the second port.

In one embodiment of the windproof structure for the flue outlet provided in the first aspect of the present disclosure, the windproof structure for the flue outlet further includes a connector. A mounting end face is disposed at the second port, one end of the connector is connected to the mounting end face, and the other end of the connector is connected to a surface of the air deflector close to the first port.

In one embodiment of the windproof structure for the flue outlet provided in the first aspect of the present disclosure, the air deflector is disk-shaped, a surface of one side of the air deflector facing away from the first port has a first deflection curved surface, and the first deflection curved surface is concentrically arranged with the air deflector and protrudes in a direction away from the first port.

In one embodiment of the windproof structure for the flue outlet provided in the first aspect of the present disclosure, the surface of the side of the air deflector facing away from the first port further has an annular second deflection curved surface and an annular third deflection curved surface, the second deflection curved surface is recessed in a direction close to the first port, the third deflection curved surface protrudes in a direction away from the first port, and the first deflection curved surface, the second deflection curved surface, and the third deflection curved surface are sequentially nested from a circle center to an edge of the air deflector.

In one embodiment of the windproof structure for the flue outlet provided in the first aspect of the present disclosure, the air deflector is disk-shaped, a surface of one side of the air deflector close to the first port has a fourth deflection curved surface, and the fourth deflection curved surface is concentrically arranged with the air deflector and is recessed in a direction away from the first port.

In one embodiment of the windproof structure for the flue outlet provided in the first aspect of the present disclosure, the surface of the side of the air deflector close to the first port also has an annular fifth deflection curved surface and an annular sixth deflection curved surface, the fifth deflection curved surface protrudes in a direction close to the first port, the sixth deflection curved surface is recessed in a direction away from the first port, and the fourth deflection curved surface, the fifth deflection curved surface, and the sixth deflection curved surface are sequentially nested from the circle center to the edge of the air deflector.

A second aspect of the present disclosure provides a gas water heater, including a water heater housing and a water heater door panel. The water heater housing is internally provided with a water heater internal component assembly having a gas heating function. The water heater door panel is disposed on one side of the water heater housing, one side, distal from the water heat internal component assembly, of the water heater door panel is provided with a first surface, and one side, close to the water heat internal component assembly, of the water heater door panel is provided with a second surface. The water heater door panel includes any of the windproof structures for the flue outlets provided in the first aspect of the present disclosure. The flue passage is formed in the door panel, the first port of the flue passage is formed in the first surface, the second port of the flue passage is formed in the second surface and communicates with the flue pipe of the water heater internal component assembly, the air deflector is spaced apart from the first surface by a preset distance, and an orthogonal projection of the air deflector onto the first surface covers the first port.

Analysis reveals that the present disclosure discloses the windproof structure for the flue outlet and the gas water heater. When the gas water heater discharges exhaust gas through the flue passage, the air deflector may block external airflow outside the recreational vehicle. This allows the exhaust gas discharged from the first port to be discharged through a gap between the air deflector and the first port, avoiding direct collision between the external airflow and internal airflow in the flue passage, thereby effectively improving the exhaust efficiency of the gas water heater. When the external airflow outside the recreational vehicle flows to the air deflector, the first deflection curved surface, the second deflection curved surface, and the third deflection curved surface may sequentially guide the external airflow. When the internal airflow in the flue passage flows to the air deflector, the fourth deflection curved surface, the fifth deflection curved surface, and the sixth deflection curved surface may sequentially guide the internal airflow, further avoiding the impact of the external airflow colliding with the internal airflow in the flue passage. In the flue passage, the increasing pipe inner diameter from the second port to the first port may ensure that a flow rate of the exhaust gas entering at the second port is greater than that of the exhaust gas discharged at the first port within the flue pipe, thereby preventing backflow of the exhaust gas at the first port during discharging, which could otherwise reduce the exhaust efficiency of the gas water heater.

BRIEF DESCRIPTION OF THE DRAWINGS

The accompanying drawings in the specification, which form a part of the present disclosure, are used for providing a further understanding of the present disclosure, and illustrative embodiments of the present disclosure and explanations thereof are used for explaining the present disclosure and are not construed as an undue limiting the present disclosure.

DESCRIPTION OF REFERENCE NUMERALS

Figure 1:
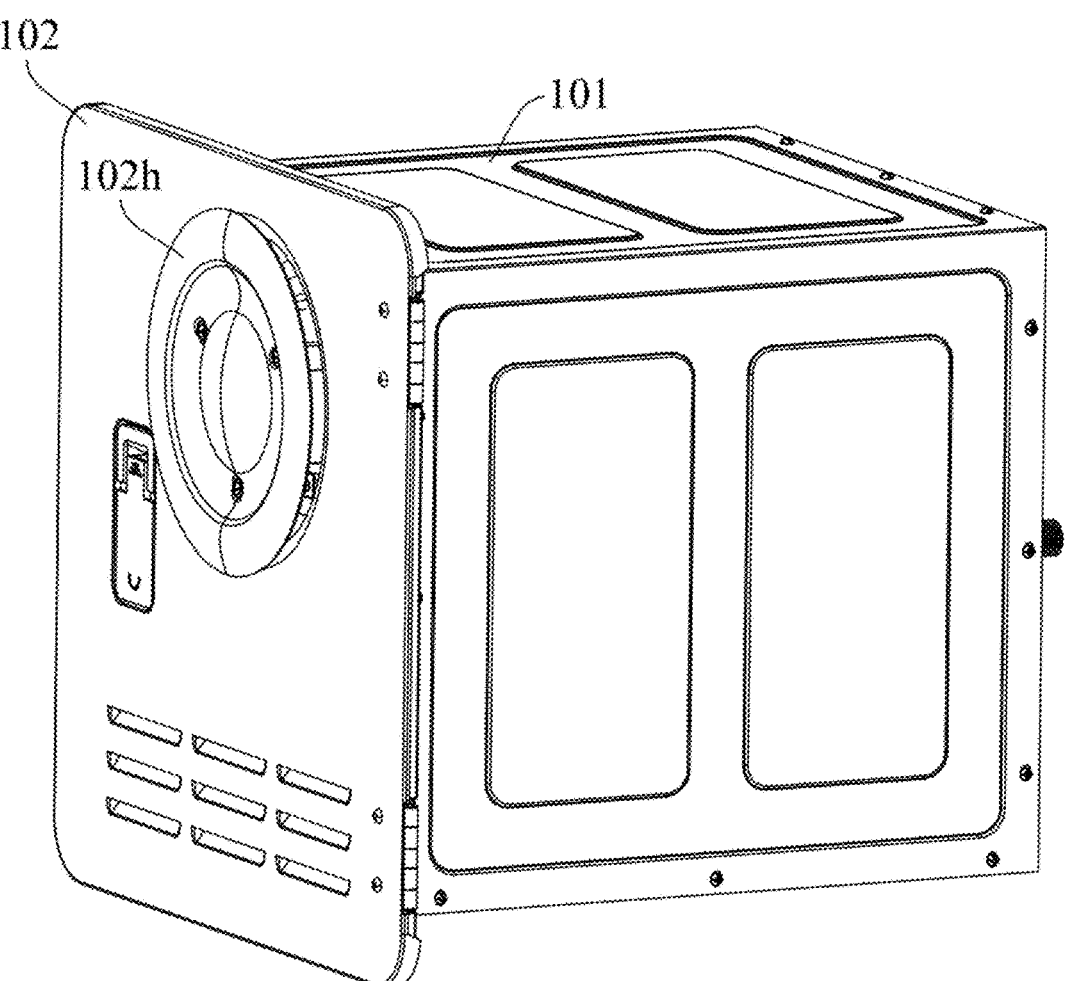
FIG. 1 is a perspective view of a gas water heater according to an embodiment of the present disclosure.

1—gas water heater; 101—water heater housing; 102— water heater door panel; 102*a*—first surface; 102*b*— second surface; 102*c*—flue passage; 102*d*—first port; 102*e*—second port; 102*f*—mounting end face; 102*g*— connector; 102*h*—air deflector; 102*i*—first deflection curved surface; 102*j*—second deflection curved surface; 102*k*—third deflection curved surface; 102*l*— fourth deflection curved surface; 102*m*—fifth deflection curved surface; 102*n*—sixth deflection curved surface; 102*o*—mounting screw; 103—water heater internal component assembly; 103*a*—flue pipe; X—external airflow; and Y—internal airflow.

DETAILED DESCRIPTION OF THE DRAWINGS AND THE PRESENTLY PREFERRED EMBODIMENTS

The present disclosure is described in detail with reference to the accompanying drawings and in combination with the embodiments as below. Each example is provided by way of explanation of the present disclosure and is not intended to limit the present disclosure. In fact, those skilled in the art should understand that modifications and variations may be made to the present disclosure without departing from the scope or spirit of the present disclosure. For example, features illustrated or described as part of one embodiment may be used in another embodiment to yield yet another embodiment. Therefore, it is intended that the present disclosure includes such modifications and variations that fall within the scope of the appended claims and equivalents thereof.

In the description of the present disclosure, terms such as "longitudinal", "transverse," "upper," "lower," "front," "rear," "left," "right," "vertical," "horizontal," "top," and "bottom" indicate orientational or positional relationships based on those shown in the accompanying drawings, are used merely for convenience in describing the present disclosure, and do not require the present disclosure to be constructed and operated in a specific orientation, and thus should not be construed as limiting the present disclosure. The terms "connected," "joined," and "arranged" as used in the present disclosure should be understood in a broad sense. For example, it may refer to a fixed connection, or a detachable connection; it may refer to a direct connection or an indirect connection through an intermediate component; or it may refer to a wired electrical connection, a wireless electrical connection, or a wireless communication signal connection. Those of ordinary skill in the art may understand specific meanings of the above-mentioned terms according to specific situations.

One or more examples of the present disclosure are illustrated in the accompanying drawings. The detailed description uses numerical and alphabetical labels to refer to the features in the accompanying drawings. Similar or analogous labels in the accompanying drawings and descriptions have been used to refer to similar or analogous parts of the present disclosure. As used herein, the terms such as "first," "second" and "third" are interchangeably used to distinguish one component from another and are not intended to indicate the position or importance of individual components.

As shown in FIG. 1 to FIG. 6, according to an embodiment of the present disclosure, a gas water heater 1 with a windproof structure for a flue outlet is provided. The gas water heater 1 includes a water heater housing 101, a water heater internal component assembly 103, and a water heater door panel 102. The water heater door panel 102 includes the windproof structure for the flue outlet, and the windproof structure for the flue outlet includes a flue passage 102*c*, an air deflector 102*h*, and a connector 102*g*.

Figure 2:
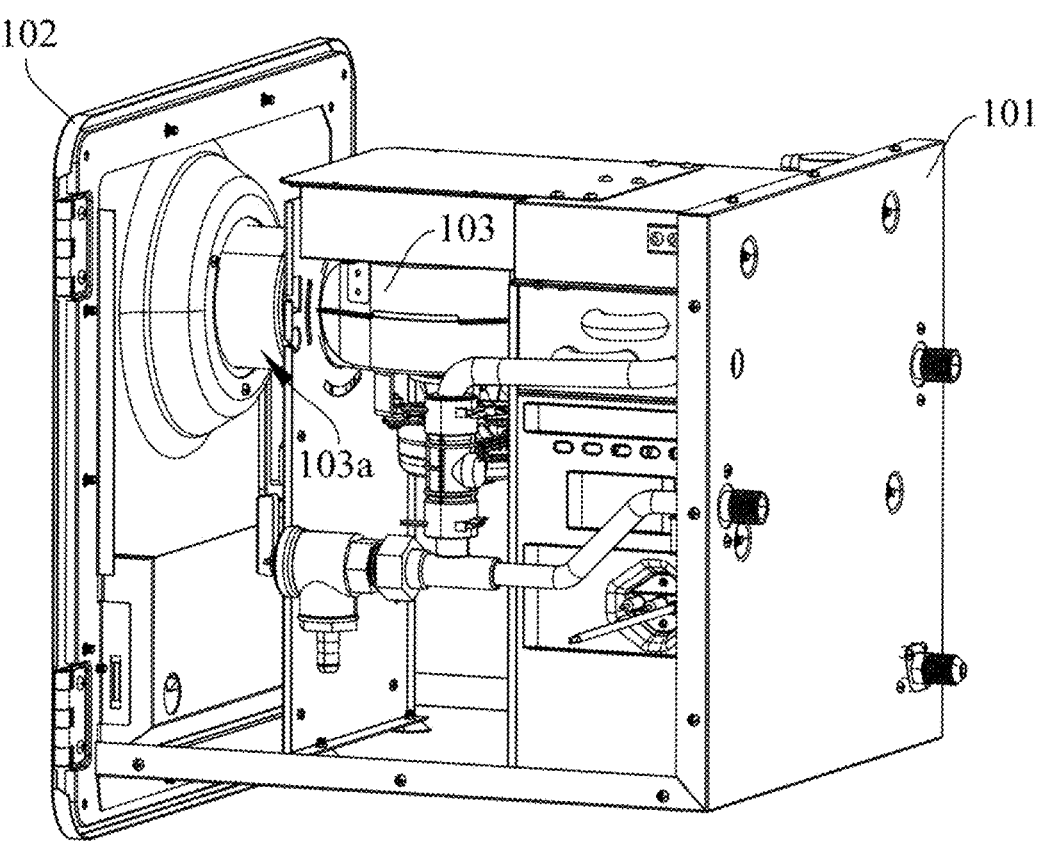
FIG. 2 is a perspective view of an internal structure of a gas water heater according to an embodiment of the present disclosure.
Figure 3:
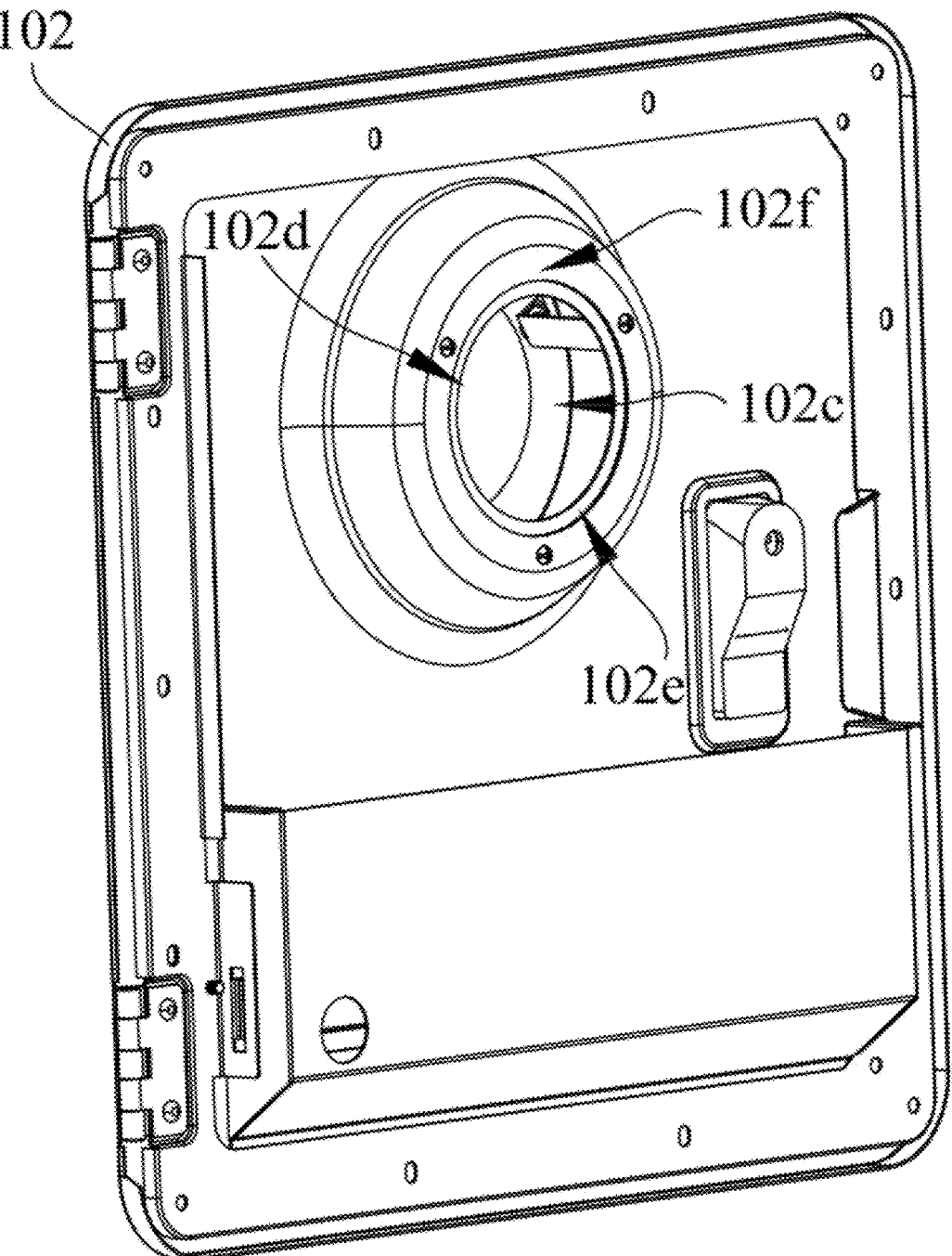
FIG. 3 is a perspective view of a water heater door panel according to an embodiment of the present disclosure.

Specifically, as shown in FIG. 1 to FIG. 2, the water heater internal component assembly 103 is disposed inside the water heater housing 101 and is used to heat water through gas. The water heater door panel 102 is hinged to one side of the housing and is used to open and close an internal space of the water heater housing 101.

Specifically, as shown in FIG. 3 to FIG. 6, the flue passage 102*c* is formed in the water heater door panel 102. A first port 102*d* of the flue passage 102*c* is formed in a first surface 102*a* of the water heater door panel 102, and a second port 102e of the flue passage 102c is formed in a second surface 102b of the water heater door panel 102. The second port 102e communicates with a flue pipe 103a of the water heater internal component assembly 103, allowing exhaust gas discharged from the flue pipe 103a to enter the flue passage 102c through the second port 102e and finally be discharged to the exterior of a recreational vehicle through the first port 102d. The air deflector 102h is spaced apart from the first surface 102a of the water heater door panel 102 by a preset distance and is detachably screwed to the flue passage 102c through the connector 102g and mounting screws 102o. When the gas water heater 1 discharges the exhaust gas through the flue passage 102c, the air deflector 102h may block airflow outside the recreational vehicle. This allows the exhaust gas discharged from the first port 102d to discharged through a gap between the air deflector 102h and the first port 102d, avoiding direct collision between external airflow X and internal airflow Y in the flue passage 102c, thereby effectively improving the exhaust efficiency of the gas water heater 1.

Figure 4:
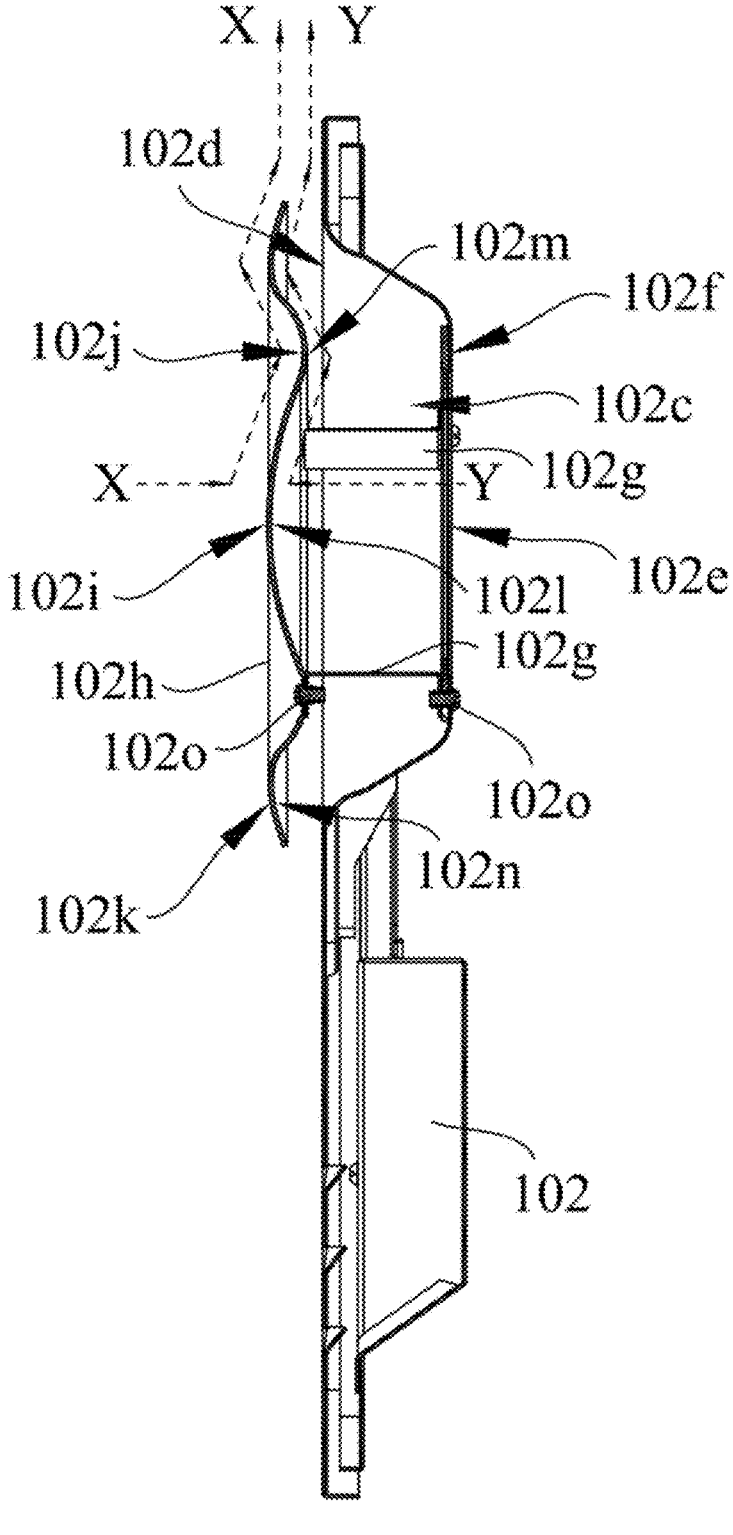
FIG. 4 is a perspective view of a cross section of a water heater door panel according to an embodiment of the present disclosure.
Figure 5:
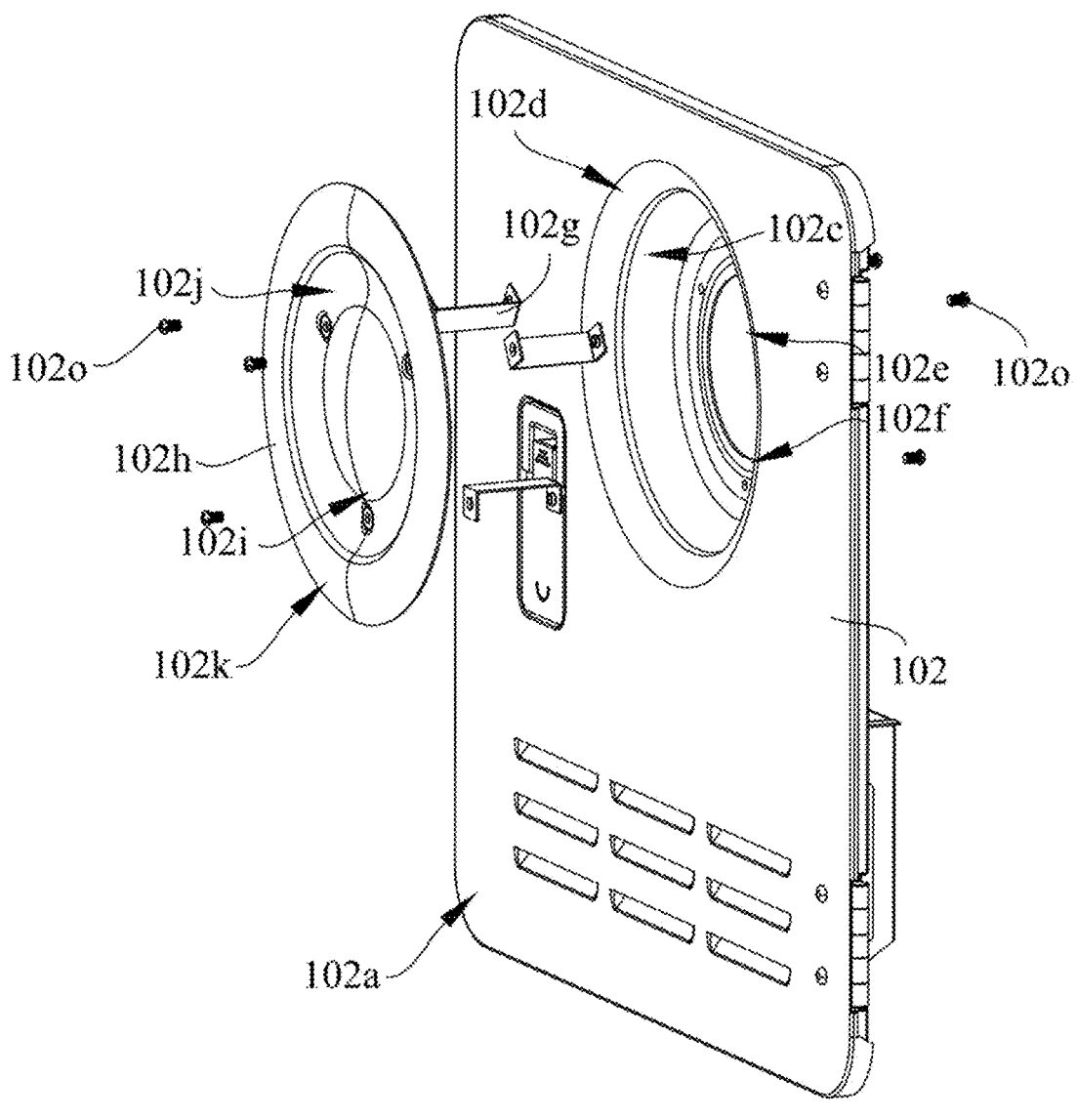
FIG. 5 is an exploded perspective view of a water heater door panel from a first angle according to an embodiment of the present disclosure.
Figure 6:
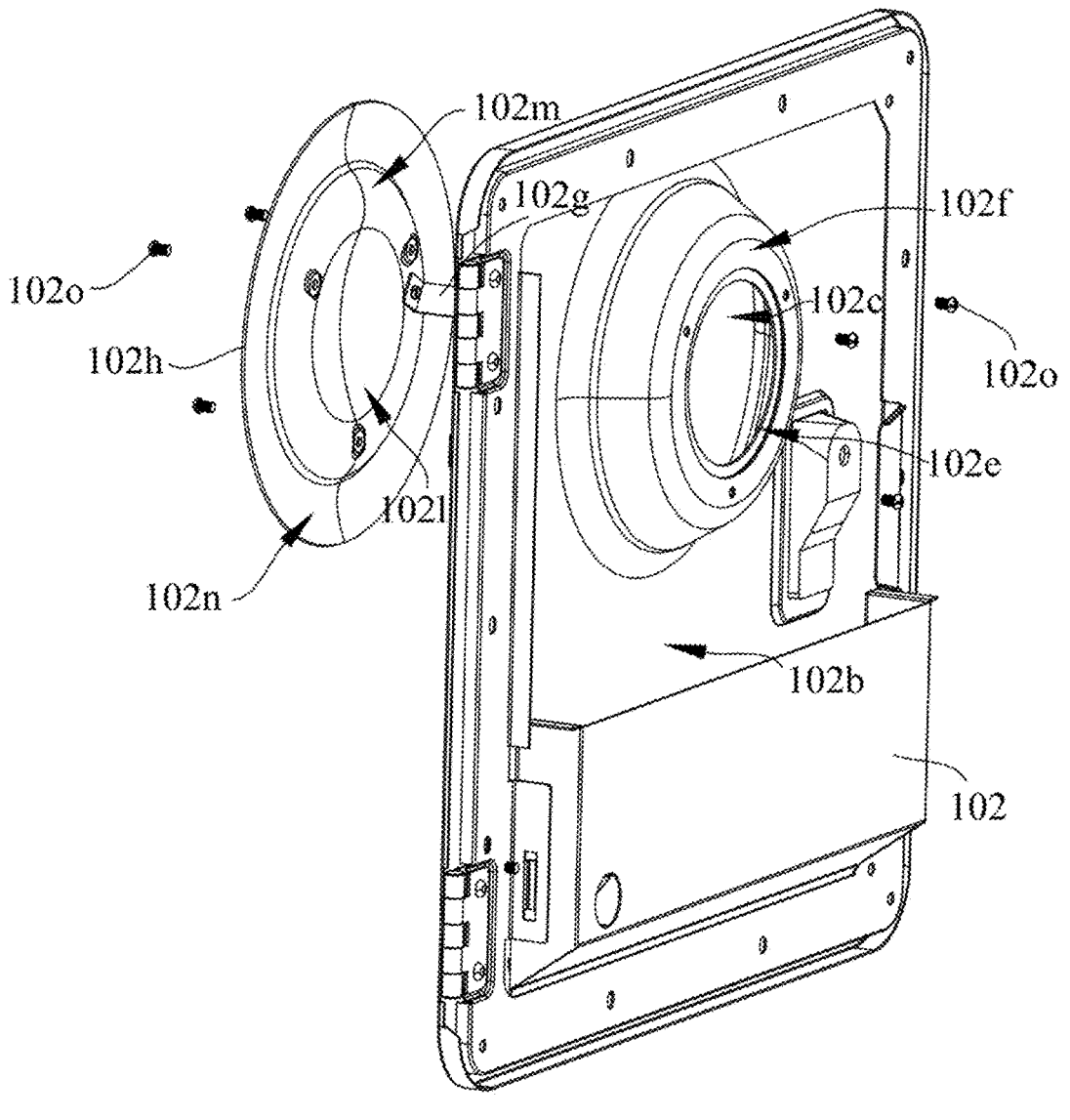
FIG. 6 is an exploded perspective view of a water heater door panel from a second angle according to an embodiment of the present disclosure.

In some embodiments, as shown in FIG. 4 to FIG. 6, a cross section of the flue passage 102c is circular, and an inner diameter of the passage decreases from the first port 102d to the second port 102e. An increasing pipe inner diameter from the second port 102e to the first port 102d may ensure that a flow rate of the exhaust gas entering at the second port 102e is greater than that of the exhaust gas discharged at the first port 102d within the flue pipe 103a, thereby preventing backflow of the exhaust gas at the first port 102d during discharging, which could otherwise reduce the exhaust efficiency of the gas water heater 1. A mounting end face 102f is disposed at the second port 102e, and the air deflector 102h is detachably screwed to the mounting end face 102f through the connector 102g and the mounting screws 102o.

In some embodiments, as shown in FIG. 4 to FIG. 6, the air deflector 102h is disk-shaped, and an orthogonal projection projected onto the first surface 102a of the door panel covers the first port 102d of a deflection passage. One side, distal from the water heater door panel 102, of the air deflector 102h has a first deflection curved surface 102i, a second deflection curved surface 102j, and a third deflection curved surface 102k. The first deflection curved surface 102i is concentrically arranged with the air deflector 102h, is of a bowl-shaped structure and protrudes in a direction away from the first surface 102a. The second deflection curved surface 102j and the third deflection curved surface 102k are both annular. The second deflection curved surface 102j is recessed in a direction close to the first surface 102a, and the third deflection curved surface 102k protrudes in a direction away from the first surface 102a. The first deflection curved surface 102i, the second deflection curved surface 102j, and the third deflection curved surface 102k are concentrically nested in sequence to form a concentric corrugated composite curved surface. When the external airflow X outside the recreational vehicle flows to the air deflector 102h, the first deflection curved surface 102i, the second deflection curved surface 102j, and the third deflection curved surface 102k may sequentially guide the external airflow X, further preventing the external airflow X from directly colliding with the internal airflow Y in the flue passage 102c.

In some embodiments, as shown in FIG. 4 to FIG. 6, one side, close to the water heater door panel 102, of the air deflector 102h has a fourth deflection curved surface 102l, a fifth deflection curved surface 102m, and a sixth deflection curved surface 102n. The fourth deflection curved surface 102l is concentrically arranged with the air deflector 102h, is of a bowl-shaped structure and is recessed in a direction away from the first surface 102a. The fifth deflection curved surface 102m and the sixth deflection curved surface 102n are both annular. The fifth deflection curved surface 102m protrudes in a direction close to the first surface 102a, and the sixth deflection curved surface 102n is recessed in a direction away from the first surface 102a. The fourth deflection curved surface 102l, the fifth deflection curved surface 102m, and the sixth deflection curved surface 102n are concentrically nested in sequence to form a concentric corrugated composite curved surface. When the internal airflow Y in the flue passage 102c flows to the air deflector 102h, the fourth deflection curved surface 102l, the fifth deflection curved surface 102m, and the sixth deflection curved surface 102n may sequentially guide the internal airflow Y, further avoiding the impact of the external airflow X directly colliding with the internal airflow Y in the flue passage 102c.

From the above-mentioned descriptions, it can be seen that the above-mentioned embodiments of the present disclosure achieve the following technical effects:

when the gas water heater 1 discharges the exhaust gas through the flue passage 102c, the air deflector 102h may block the external airflow X outside the recreational vehicle. This allows the exhaust gas discharged from the first port 102d to discharged through the gap between the air deflector 102h and the first port 102d, preventing the external airflow X from directly colliding with the internal airflow Y in the flue passage 102c, thereby effectively improving the exhaust efficiency of the gas water heater 1. When the external airflow X outside the recreational vehicle flows to the air deflector 102h, the first deflection curved surface 102i, the second deflection curved surface 102j, and the third deflection curved surface 102k may sequentially guide the external airflow X. When the internal airflow Y in the flue passage 102c flows to the air deflector 102h, the fourth deflection curved surface 102l, the fifth deflection curved surface 102m, and the sixth deflection curved surface 102n may sequentially guide the internal airflow Y, further preventing the external airflow X from colliding with the internal airflow Y in the flue passage 102c. In the flue passage 102c, the increasing pipe inner diameter from the second port 102e to the first port 102d may ensure that the flow rate of the exhaust gas entering at the second port 102e is greater than that of the exhaust gas discharged at the first port 102d within the flue pipe 103a, thereby preventing backflow of the exhaust gas at the first port 102d during discharging, which could otherwise reduce the exhaust efficiency of the gas water heater 1.

The above-mentioned descriptions are merely some embodiments of the present disclosure and are not intended to limit the present disclosure. For those skilled in the art, the present disclosure may have various modifications and changes. Any modifications, equivalent replacements, improvements, etc., made within the spirit and principle of the present disclosure shall fall within the scope of protection of the present disclosure.

The invention claimed is:

1. A windproof structure for a flue outlet, applied to a gas water heater, comprising:

a flue passage extending in a preset direction and defining a first port and a second port that are in communication in an extension direction, wherein the first port is configured to be in communication with an outside, and the second port is configured to be in communication with a flue pipe of the gas water heater; and an air deflector disposed outside the flue passage and located on one side of the first port facing away from the second port, wherein the air deflector is spaced apart from the first port by a preset distance, and an orthogonal projection of the air deflector onto the first port covers the first port;

wherein a surface of a side of the air deflector facing away from the first port has a first deflection curved surface, and the first deflection curved surface protrudes in a direction away from the first port, and wherein the surface of the side of the air deflector facing away from the first port further defines an annular second deflection curved surface and an annular third deflection curved surface, the second deflection curved surface is recessed in a direction facing the first port, and the third deflection curved surface protrudes in a direction away from the first port.

2. The windproof structure for the flue outlet according to claim 1, wherein:

a cross section of the flue passage is circular, and an inner diameter of the passage decreases from the first port to the second port.

3. The windproof structure for the flue outlet according to claim 2, further comprising:

a connector, wherein a mounting end face is disposed at the second port, one end of the connector is connected to the mounting end face, and another end of the connector is connected to a surface of the air deflector.

4. The windproof structure for the flue outlet according to claim 1, wherein:

the air deflector is disk-shaped, and the first deflection curved surface is concentrically arranged with the air deflector.

5. The windproof structure for the flue outlet according to claim 4, wherein:

the first deflection curved surface, the second deflection curved surface, and the third deflection curved surface are sequentially nested from a circle center to an edge of the air deflector.

6. The windproof structure for the flue outlet according to claim 1, wherein:

the air deflector is disk-shaped, a surface of one side of the air deflector facing the first port defines a first deflecting curved surface, and the first deflecting curved surface is concentrically arranged with the air deflector, and is recessed in a direction away from the first port.

7. A windproof structure for a flue outlet, applied to a gas water heater, comprising:

a flue passage extending in a preset direction and defining a first port and a second port that are in communication in an extension direction, wherein the first port is configured to be in communication with an outside, and the second port is configured to be in communication with a flue pipe of the gas water heater; and an air deflector disposed outside the flue passage and located on one side of the first port facing away from the second port, wherein the air deflector is spaced apart from the first port by a preset distance;

wherein a surface of one side of the air deflector facing the first port defines a first deflecting curved surface, and the first deflecting curved surface is recessed in a direction away from the first port; and wherein the surface of the side of the air deflector facing the first port further defines an annular second deflecting curved surface and an annular third deflecting curved surface, the annular second deflecting curved surface protrudes in a direction facing the first port, the annular third deflecting curved surface is recessed in a direction away from the first port; and the first deflecting curved surface, the annular second deflecting curved surface, and the annular third deflecting curved surface are sequentially nested from the circle center to the edge of the air deflector.

8. The windproof structure for the flue outlet according to claim 7, wherein:

the air deflector is disk-shaped, and the first deflecting curved surface is concentrically arranged with the air deflector.

9. The windproof structure for the flue outlet according to claim 7, wherein:

an orthogonal projection of the air deflector onto the first port covers the first port.

10. The windproof structure for the flue outlet according to claim 7, wherein:

the air deflector is spaced apart from the first port by a preset distance.

11. A gas water heater, applied to a recreational vehicle, comprising:

a water heater housing internally provided with a water heater internal component assembly having a gas heating function; and a water heater door panel disposed on one side of the water heater housing, wherein one side of the water heater door panel facing away from the water heater internal component assembly is defined with a first surface, and one side of the water heater door panel facing the water heater internal component assembly is defined with a second surface; and the water heater door panel comprises a windproof structure for a flue outlet, the water heater door panel further comprises:

a flue passage extending in a preset direction and defining a first port and a second port that are in communication in an extension direction, wherein the first port is configured to be in communication with an outside, and the second port is configured to be in communication with a flue pipe of the gas water heater; and an air deflector disposed outside the flue passage and located on one side of the first port facing away from the second port, wherein the air deflector is spaced apart from the first port by a preset distance, and an orthogonal projection of the air deflector onto the first port covers the first port;

the flue passage is formed in the door panel, the first port of the flue passage is formed in the first surface, the second port of the flue passage is formed in the second surface and communicates with the flue pipe of the water heater internal component assembly, the air deflector is spaced apart from the first surface by the preset distance, and the orthogonal projection of the air deflector onto the first surface covers the first port.

* * * * *